United States Patent [19]

Spisak

[11] 3,988,040
[45] Oct. 26, 1976

[54] WHEEL TRIM ASSEMBLY

[76] Inventor: Edward G. Spisak, 35700 Oakwood Lane, Westland, Mich. 48185

[22] Filed: Mar. 31, 1975

[21] Appl. No.: 563,604

[52] U.S. Cl. .............................................. 301/37 B
[51] Int. Cl.² ........................................... B60B 7/06
[58] Field of Search ............ 24/73 HC; 301/108 R, 301/108 A, 37 R, 37 ST, 37 TC, 37 P, 37 SS, 37 T, 37 CD, 37 TP, 37 PB, 37 B

[56] References Cited
UNITED STATES PATENTS

| | | | |
|---|---|---|---|
| 2,915,335 | 12/1959 | Barnes | 301/37 ST |
| 3,425,747 | 2/1969 | Alfes | 301/37 R |

Primary Examiner—Allen N. Knowles
Assistant Examiner—Hadd Lane
Attorney, Agent, or Firm—Fisher, Gerhardt & Groh

[57] ABSTRACT

A wheel trim assembly for an automotive vehicle wheel in which a retaining member is adapted to support either a decorative wheel cover or wheel ring and is provided with retaining devices so disposed on the retaining member that when the trim assembly is attached to the wheel of the vehicle, portions of the retaining devices are disposed at an angle to the tire supporting flange of the wheel so that both axial and rotational displacement of the trim assembly relative to the wheel are prevented.

9 Claims, 5 Drawing Figures

U.S. Patent  Oct. 26, 1976  3,988,040
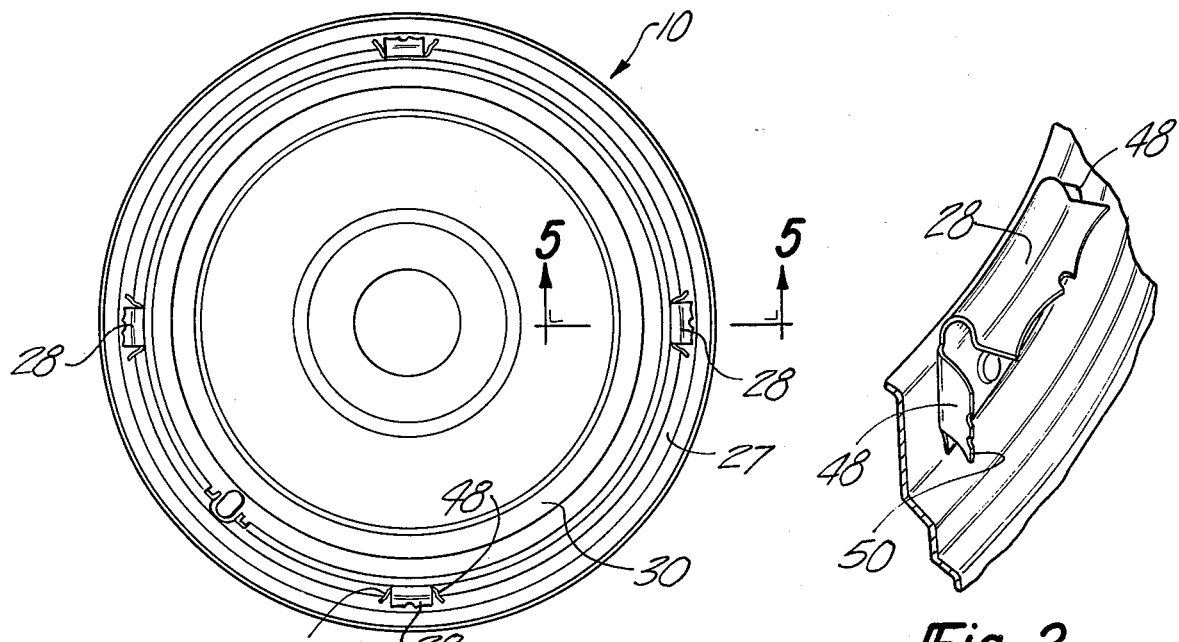
Fig-1
Fig-2
Fig-3
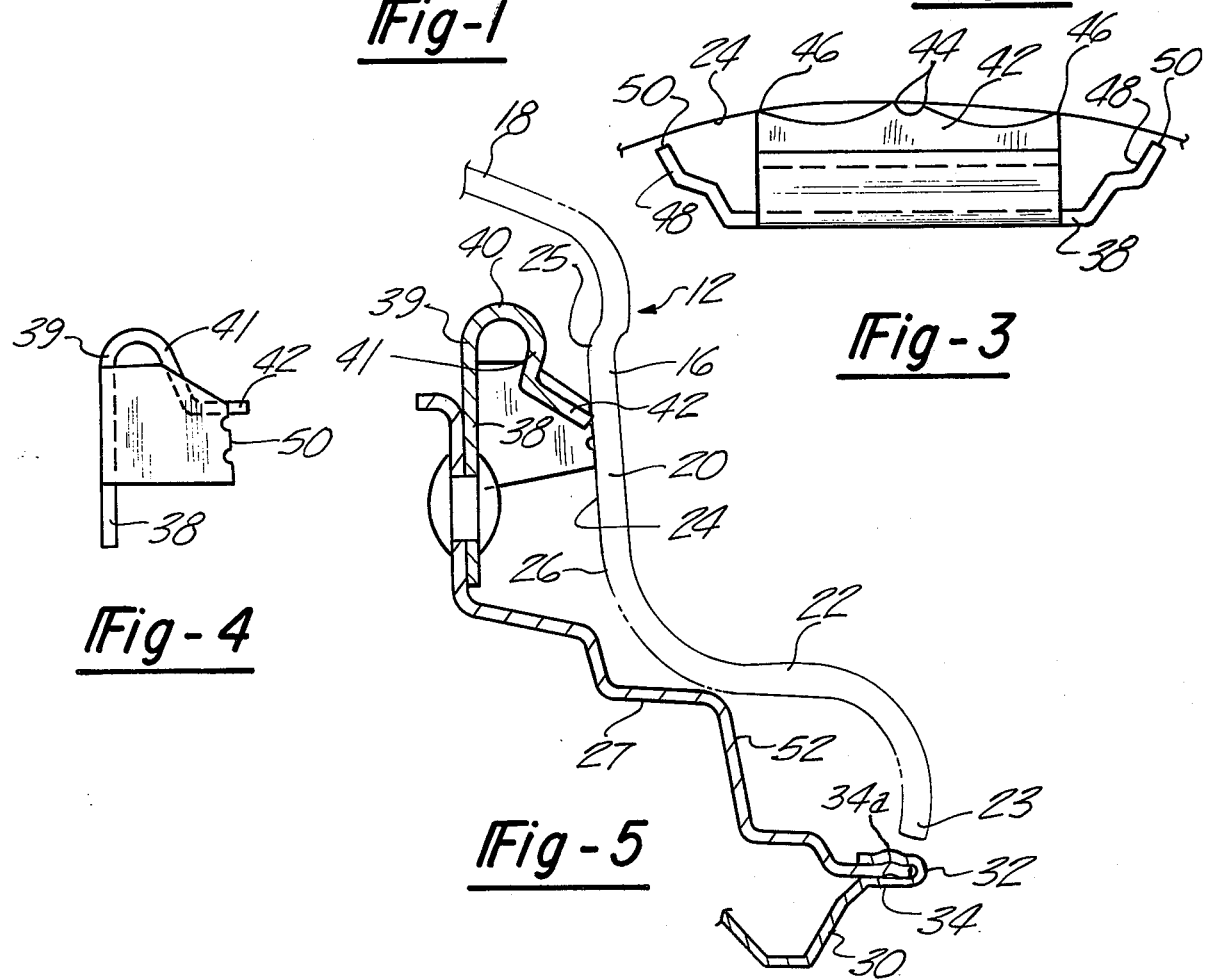
Fig-4
Fig-5

3,988,040

WHEEL TRIM ASSEMBLY

SUMMARY OF THE INVENTION

This invention relates to a trim assembly for an automotive vehicle wheel, and particularly to an improved retention arrangement for retaining the trim assembly on the wheel of the vehicle.

Wheel trim in the form of a wheel cover or a decorative ring are frequently mounted on the wheels of the vehicle but are difficult to maintain in position on the wheel because the wheel itself is subject to complex loading and stresses which tend to temporarily deform the wheel as a result of applying the brakes, vehicle loading, turning of the vehicle on curves and vibrations and shocks from the road surface itself. A wheel trim assembly, such as a cover or ring, when mounted on a wheel also is subject to such stresses and deflection and centrifical loading and inertia of the wheel trim causes a relative movement both circumferentially and axially of the wheel which ultimately results in separation and loss of the trim assembly or damage to the valve stem which often passes through an opening in the wheel trim assembly from the tire cavity.

The wheels on which wheel trim assemblies are used are generally of the standard configuration, but without any special provision for attaching wheel trim. Furthermore, such wheels are manufactured to relatively wide dimensional tolerances. Wheel trim members must be able to accommodate such wide wheel tolerances, and also, for economical reasons, it is desirable that the trim members themselves be allowed relatively wide manufacturing tolerances.

These problems make it difficult to economically provide a wheel trim assembly which will be firmly retained on the wheel despite rough service use and wide variations in manufacturing tolerances of both the wheel and trim assembly.

In many instances, the problem of retention is further aggravated by the configuration of the wheel in which the wheel portion available to receive or be engaged by the trim ring assembly is disposed at an angle which resists rather than assists retention.

It is an object of the invention to provide an improved wheel trim assembly with improved retaining means coacting with the wheel to firmly maintain the trim assembly on the wheel in a centered relationship to the latter.

It is another object of the invention to provide an improved wheel trim assembly in which retaining means have portions resiliently engaging portions of the wheel to increasingly resist relative axial displacement of the wheel trim assembly relative to the wheel as well as to resist relative rotational movement between the trim assembly and the wheel.

A wheel trim assembly has been provided which incorporates retention devices by which the wheel trim assembly may be attached to an angularly disposed and radially extending tire supporting flange of a convention vehicle wheel. The retaining devices are formed of hardened spring-like steel and have portions which are deflectable upon attachment of the trim assembly to the wheel so that portions are disposed at an angle resisting axial and circumferential displacement of the wheel trim assembly relative to the wheel.

DESCRIPTION OF THE DRAWINGS

FIG. 1 is a plan view of a wheel trim assembly embodying the invention as viewed from the back side of the assembly;

FIG. 2 is a perspective view at an enlarged scale showing a portion of the wheel trim assembly in FIG. 1;

FIG. 3 is a view of the retaining devices seen in FIG. 1 but at an enlarged scale;

FIG. 4 is an end view of the retaining device seen in FIG. 3; and

FIG. 5 is a sectional view of a portion of the wheel trim assembly taken generally on line 5—5 in FIG. 1 and showing the wheel trim assembly attached to a portion of a vehicle wheel.

DETAILED DESCRIPTION

The wheel trim assembly, including the improved retaining construction embodying the invention, is generally designated at 10 and is adapted for attachment to a standard vehicle wheel 12, a portion of which is shown in FIG. 5.

Typically, a vehicle wheel 12 has a tire supporting rim 16. Rim 16 has a radially extending side flange 18 merging with a generally axially extending intermediate flange 20. The intermediate flange 20 merges with a radially extending outer flange 22 which terminates in an axially outer lip portion 23. The intermediate flange 20 and the radial outer flange 22 act to support one bead of a tire which is not shown. Typically, an inner surface 24 of the intermediate flange 10 tapers or diverges outwardly between points indicated at 25 and 26 relative to the axis of the wheel at an angle of approximately 5° to 15°. It is to this surface 24 of the intermediate flange 20 that the trim assembly 10, of the present invention, is attached and retained.

The trim assembly 10 includes a retaining member or ring 27 to which a plurality of retaining devices 28 are connected for retention of the member 27 relative to the wheel 12. Referring to FIG. 1 and 5, the retaining member 27 supports a wheel cover member 30 which may be made of decorative metal such as stainless steel or the like. The wheel cover may be connected to the member 27 by means of folding the peripheral edge 32 of the metal cover 30 to the radial outer flange 34 of the retaining ring 27, as best seen in FIG. 5. For this purpose the flange 34 is provided with an annular bead 34a. When the peripheral edge 32 is folded over the flange 34, it engages and partially deflects the bead 34a. This provides a tight clamping action which prevents relative movement of the wheel cover and retaining member 27. In the alternative, the retaining member 27 may support a decorative ring covering only an annular portion of the wheel 12.

The retaining devices 28 are disposed on the retaining ring 27 at circumferentially spaced portions. Preferably, a minimum of three retaining devices 28 are employed although as shown in the drawings an even number of retaining devices 28 may be disposed with pairs in diametrically opposed relationship to each other.

The retaining devices 28 are each made of a single piece of material, preferably hardened spring-like steel. The retaining devices 28 each include a central base portion 38 which may be connected to the ring 27 in numerous ways such as by welding or as shown, by a rivet 31. The base portion 38 merges, as viewed in FIGS. 4 & 5, with one leg 39 of a generally U-shaped portion 40. The other leg 41 of the U-shaped portion 40 merges with an outer blade portion 42 which is disposed in the plane generally perpendicular to the base portion 38 when the retaining device 28 is detached from the wheel of the vehicle as best seen in FIG. 4.

As best seen in FIG. 3, the blade portion 42 is provided with a pair of intermediate teeth 44 and a pair of teeth 46, the points of which are on an arc conforming generally to the curvature of the inner circumferential surface 24 of the intermediate flange 20 of the wheel 12.

The opposite ends of the base portions 28 are provided with a pair of generally radially extending finger portions 48. In the relaxed condition of the retaining devices 28 when the trim assembly is detached from a wheel 28 as seen in FIG. 1, the finger portions 48 diverge from each other at an angle which is greater than the angle between wheel radii passing through the ends of the fingers 48.

Referring to FIG. 4, the ends of the finger portions 48 are each provided with a tooth-like edge portion 50 which is disposed at an angle to the base 38 to conform to the angular disposition of the surface 24 of the intermediate flange 20 of the wheel 12.

From an examination of FIG. 3, it will be observed that when the trim assembly is detached from a wheel, the teeth 44 and 46 extend radially outwardly a distance slightly greater than the toothed edge 50 on the finger portions 48.

When the wheel trim assembly 10 is to be attached to the wheel 12 of a vehicle, the trim assembly 10 is generally axially aligned to the wheel and is moved axially inwardly relative to the wheel. The blade portions 42 of the retaining devices 28, which extend radially outwardly the greatest distance, will engage the wheel rim 16 at the juncture between the intermediate flange 20 and the radial outer flange 22. Inward movement of the wheel trim assembly 10 relative to the wheel 12 will increasingly deflect the blade portion 42 and the U-shaped portion 40 so that in the final attached position, as shown in FIG. 5, the blade portion 42 is disposed at an angle to the intermediate flange 20 and the U-shaped portion 40 is slightly deflected.

During axial inward movement of the trim assembly 10 relative to the wheel 12 and after the blade portion 42 begins deflection because of engagement with the intermediate flange 20, the finger portions 48 also will come into engagement with the intermediate flange 20 and will be deflected in opposite directions from each other so that the angle of divergence between each pair of fingers 48 and the surface of the intermediate flange increases. In this manner, the angle of attack of the finger 48 relative to the intermediate flange 20 tends to decrease and to improve the retention characteristics of the fingers 44. The finger 48 at one end of the retaining device 28 will prevent indexing of the wheel trim 10 relative to the wheel 12 in one direction and the finger 48 at the other end of the retaining device 28 will prevent indexing of the wheel trim in the opposite direction.

Axial inward movement of the retaining devices 28 relative to the wheel rim 12 is limited by engagement of an intermediate flange 52 of the retaining ring 27 with the outer flange 22 of the wheel 12.

A wheel trim assembly has been provided in which retaining devices are mounted on a retaining ring for engagement with an angularly disposed tire supporting flange of a conventional wheel. The retaining devices are so arranged that blade portions and finger portions are angularly disposed relative to the inclined tire supporting flange of the wheel to prevent both axial and relative rotational movement between the retention ring and the wheel.

The embodiments of the invention in which an exclusive property or privilege is claimed are defined as follows:

1. A wheel trim for a multi-flanged wheel of the type having a radially extending outer wheel flange forming a terminal lip portion, a radially extending outer flange, and an intermediate flange merging with said outer flange and diverging outwardly relative to the axis of said wheel, the combination comprising a retaining member, a plurality of retaining means mounted in annularly spaced relationship on said retaining member and being disposed between said intermediate wheel flange and said retaining member, each of said retaining means comprising a base member connected to said retaining member, a U-shaped portion merging with said base member and extending radially outwardly from said retaining member toward said wheel, a blade portion projecting radially outwardly from said U-shaped member and having a peripheral edge portion extending circumferentially of said wheel for engagement with an internal surface of said intermediate wheel flange, a pair of fingers extending generally radially from said base member at circumferentially spaced opposite ends thereof, said fingers diverging radially outwardly from each other, said U-shaped member being deflectable upon engagement of said blade portion with said intermediate wheel flange to position said blade at an angle relative to said wheel for engagement with said intermediate wheel flange to resist axial movement of said retaining ring relative to said wheel, said pair of fingers being deflectable relative to said base member independently of each other by said intermediate flange to decrease the angle of each of said fingers relative to said intermediate flange to increase the resistance of one of said fingers to relative rotation of said retaining member and wheel in one direction and to increase the resistance of the other of said fingers to relative rotation in the opposite direction.

2. The combination of claim 1 in which said edge portion of said blade is provided with a plurality of tooth portions for bitingly engaging said intermediate wheel flange.

3. The combination of claim 1 in which each of said fingers is provided with a tooth portion for biting engagement in opposed circumferential directions with said intermediate flange of said wheel.

4. The combination of claim 3 in which said tooth portions of each of said fingers are inclined at an angle corresponding to the divergence of said intermediate wheel flange.

5. The combination of claim 1 in which said retaining means are formed of hardened steel and in which said wheel is formed of softer material.

6. The combination of claim 1 and further comprising an ornamental wheel trim member connected to said retaining member.

7. The combination of claim 1 in which said retaining member is an annular ring, and an ornamental wheel trim member attached to said annular ring.

8. The combination of claim 1 in which said retaining member has an annular bead formed on one side of said radially extending flange, and an ornamental wheel trim member having portions engaging one side of said flange and said annular bead.

9. The combination of claim 1 in which said retaining member has a radially extending outer flange coextensive with the terminal lip portion of said wheel, an axially extending flange merging with said radially extending flange and being engagable with said outer wheel flange to limit axial inward movement of said retaining member relative to said wheel.

* * * * *